(12) United States Patent
Koda et al.

(10) Patent No.: US 7,398,741 B2
(45) Date of Patent: Jul. 15, 2008

(54) REMOTE CONTROL UNMANNED BOAT AND REMOTE CONTROL DEVICE

(75) Inventors: Yoshiharu Koda, Tokyo (JP); Kojiro Koda, Tokyo (JP)

(73) Assignee: Coden Co., Ltd., Tokyo (JP)

( * ) Notice: Subject to any disclaimer, the term of this patent is extended or adjusted under 35 U.S.C. 154(b) by 274 days.

(21) Appl. No.: 11/052,669

(22) Filed: Feb. 7, 2005

(65) Prior Publication Data

US 2005/0268834 A1 Dec. 8, 2005

(30) Foreign Application Priority Data

Jun. 4, 2004 (JP) ............................ 2004-167637

(51) Int. Cl.
*B63H 25/00* (2006.01)
(52) U.S. Cl. ............................................... 114/144 RE
(58) Field of Classification Search .................. 701/21; 144/144 E, 144 RE
See application file for complete search history.

(56) References Cited

U.S. PATENT DOCUMENTS

| | | | |
|---|---|---|---|
| 2,582,015 A | 1/1952 | Duncan, Jr. |
| 3,203,131 A | 8/1965 | Myers |
| 3,710,500 A | 1/1973 | Pena |
| 3,911,609 A | 10/1975 | Baya |
| 4,161,077 A | 7/1979 | Ciaccio et al. |
| 4,253,165 A | 2/1981 | Christiansen |
| 4,270,307 A | 6/1981 | Arigaya |
| 4,339,811 A | 7/1982 | Bednarz et al. |
| 4,339,888 A | 7/1982 | Sheng-Jung |
| 4,442,621 A | 4/1984 | Kent |
| 4,446,729 A | 5/1984 | Watson, III |
| 4,757,633 A | 7/1988 | Van Cleve |
| 4,856,222 A | 8/1989 | Hannam |
| 5,077,929 A | 1/1992 | Khan |
| 5,086,581 A | 2/1992 | Barra et al. |
| 5,109,213 A | 4/1992 | Williams |
| 5,154,016 A | 10/1992 | Fedora et al. |

(Continued)

FOREIGN PATENT DOCUMENTS

EP 0 816 962 A1 3/1997

(Continued)

*Primary Examiner*—Ed Swinehart
(74) *Attorney, Agent, or Firm*—Synnestvedt & Lechner LLP

(57) ABSTRACT

This invention concerns a remote control unmanned boat which can be freely operated by remote control and a remote control device. The remote control unmanned boat comprises a propelling power source 11 for generating a propelling power, a steering device 13 for freely varying the direction of advance, a first transmit-receive antenna 24 for receiving the signal transmitted by ratio from a control device 20, a first controller 15 for controlling the propelling power source 11 and the steering device 13 based on the signal received from the first transmit-receive antenna 14, a memory device 17 for memorizing the initial position set in advance, and a GPS antenna 16 for receiving the electric wave transmitted from an artificial satellite. The first controller 15 calculates the present position based on the electric wave received by the GPS antenna 16 and, when the stated condition is satisfied, initiates automatic control of the propelling power source 11 and the steering device 13 so as to attain regression to the initial position based on the present position and the initial position. Thus, the remote control unmanned boat has no possibility of being missed.

13 Claims, 9 Drawing Sheets

U.S. PATENT DOCUMENTS

| | | |
|---|---|---|
| 5,165,193 A | 11/1992 | Dankwardt |
| 5,201,884 A | 4/1993 | Nicholas |
| 5,293,712 A | 3/1994 | Lo |
| 5,309,664 A | 5/1994 | Wright |
| 5,361,530 A | 11/1994 | Kashani et al. |
| 5,363,587 A | 11/1994 | Nordling |
| 5,397,255 A | 3/1995 | Heer |
| 5,453,035 A | 9/1995 | Jenkins |
| 5,581,932 A | 12/1996 | Bell |
| 5,806,232 A | 9/1998 | James |
| 6,041,537 A | 3/2000 | Sullivan |
| 6,520,105 B2 * | 2/2003 | Koda et al. .................. 114/255 |
| 6,595,315 B1 * | 7/2003 | Fujimoto et al. ............ 181/124 |
| 2005/0204992 A1 * | 9/2005 | Shelton et al. .............. 114/312 |

FOREIGN PATENT DOCUMENTS

| | | |
|---|---|---|
| EP | 1 023 830 B1 | 1/2000 |
| FR | 2666198 | 3/1992 |
| FR | 2 737 026 A | 7/1995 |
| JP | 02113839 | 10/1988 |
| JP | 006780 | 1/1995 |
| JP | 11300055 | 4/1998 |
| JP | 11-148927 | 6/1999 |
| JP | 2001-247085 | 9/2001 |

* cited by examiner

REMOTE CONTROL UNMANNED BOAT AND REMOTE CONTROL DEVICE

CROSS REFERENCE TO RELATED APPLICATIONS

The present application is related to, and claims priority from, Japanese patent application no. 2004-167637 filed Jun. 4, 2004, the entire contents of which is hereby incorporated by reference in its entirety.

BACKGROUND OF THE INVENTION

1. Field of the Invention

This invention relates to a remote control unmanned boat which can be freely operated by remote control and to a remote control device therefore.

2. Description of the Prior Art

At various scenes, unmanned models which permit free remote control are being utilized.

For the purpose of surveying the conditions of water bottoms and water bodies of seas, lakes, ponds, and rivers, an unmanned boat which is capable of remote control (hereinafter referred to as "remote control unmanned boats") is used. The remote control unmanned boat is loaded with a sonar and consequently enabled by transmitting an ultrasonic wave toward the water bottom and receiving the ultrasonic wave reflected as by the water bottom to detect the condition of a water bottom or a water body. An operator can operate this remote control unmanned boat from a distant place and survey a water bottom at an expected place. A technique of this system is disclosed in the official gazette of JP-A-HEI 11-350536. This technique enables the survey to be effected at a shoal or a narrow water region which defies approach by a large manned boat even during a foul weather and day and night.

When the remote control unmanned boat of such a construction as described above is operated, however, it does not always follow that the operator will succeed in controlling this remote control unmanned boat. The remote control unmanned boat will be no longer controllable in the following cases, for example, as when the remote control unmanned boat rides over waves and flows to a place too distant to be reached by the electric waves of a remote control device, when the boat body is vigorously tossed by waves and the antenna for receiving the electric waves of the remote control device is broken by collision of the boat against a rock, and when the power source for the remote control unmanned boat is exhausted and prevented from supplying a drive electric power.

In such a case, men are compelled to search for the remote control unmanned boat. The possibility that this search will end in failing to locate and recover the missing boat is not undeniable.

SUMMARY OF THE INVENTION

It is an object of the invention to provide a remote control unmanned boat which is not lost but is recovered without fail and a remote control device (inclusive of a radio base station) therefore.

This invention has the remote control unmanned boat formed of a propelling power source for generating a propelling power, a steering device for freely changing the traveling direction, a first transmit-receive antenna for receiving the signal transmitted by ratio from the remote control device, a first controller for controlling the propelling power source and the steering device based on the signal received by the first transmit-receive antenna, a memory device for memorizing the initial position to be set, and a GPS antenna for receiving an electric wave transmitted by an artificial satellite. The first controller computes the present position based on the electric wave received by the GPS antenna and, with satisfaction of the prescribed conditions, initiates automatic control of the propelling power source and the steering device directed toward regression to the initial position based on the present position and the initial position.

The remote control device of the boat is composed of a second transmit-receive antenna for transmitting by radio a signal concerning the operation of the propelling power source and the steering device to the remote control unmanned boat and receiving the information of the observation concerning the states of water body and water bottom surveyed by a surveying device and a second controller for feeding the operational signals concerning the propelling power source, steering device, and surveying device to the second transmit-receive antenna.

By the remote control unmanned boat according to this invention, the regression to the initial position is automatically accomplished when the prescribed conditions are satisfied. The remote control unmanned boat cannot be lost.

The remote control device contemplated by this invention is capable of transmitting by ratio the signal concerning the operation of the remote control unmanned boat. The operator, therefore, can steer the remote control unmanned boat freely.

The remote control device according to this invention is capable of receiving the information concerning the states of water body and water bottom surveyed by the surveying device of the remote control unmanned boat. Thus, the information concerning the states of water body and water bottom can be promptly analyzed or accumulated and used for producing map data.

These and other features of the invention will be more fully understood by reference to the following drawings.

DETAILED DESCRIPTION OF THE INVENTION

Now, the mode of embodiment of this invention will be described below with reference to the drawings.

Figure 1:
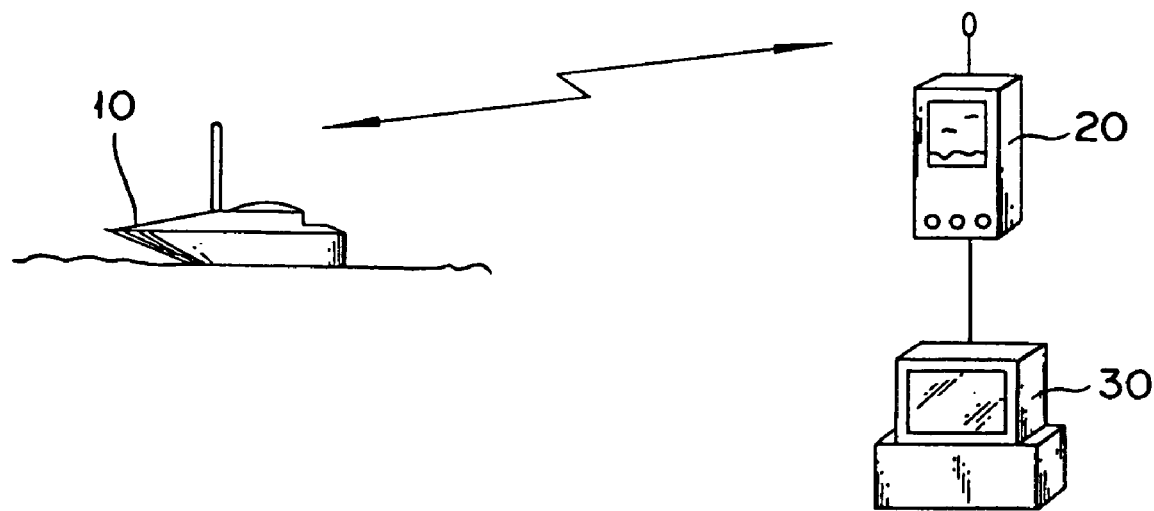
FIG. 1 is a diagram depicting a remote control unmanned boat of this invention and a remote control device used therefore.

FIG. 1 is a diagram depicting a remote control unmanned boat contemplated by this invention and a remote control device used therefore.

As illustrated in FIG. 1, a remote control unmanned boat of this invention (hereinafter referred to as "boat") 10 and a remote control device (hereinafter referred to as "control device") 20 are capable of mutual telecommunication using a specific electric wave.

The boat 10 is freely advanced, circles, and retracted on water in accordance with an electric wave transmitted from the control device 20.

The boat 10, after satisfying a specific condition, is automatically regressed to the initial position which is set initially as described specifically herein below.

The control device 20 can be connected to a computer 30 through the medium of a cable. The control device 20 can transmit specific information to the computer 30. The computer 30 is capable of accumulating and analyzing specific information to be received and produce new data.

Now, the components forming the remote control system will be described in detail below.

(Boat)

Figure 2:
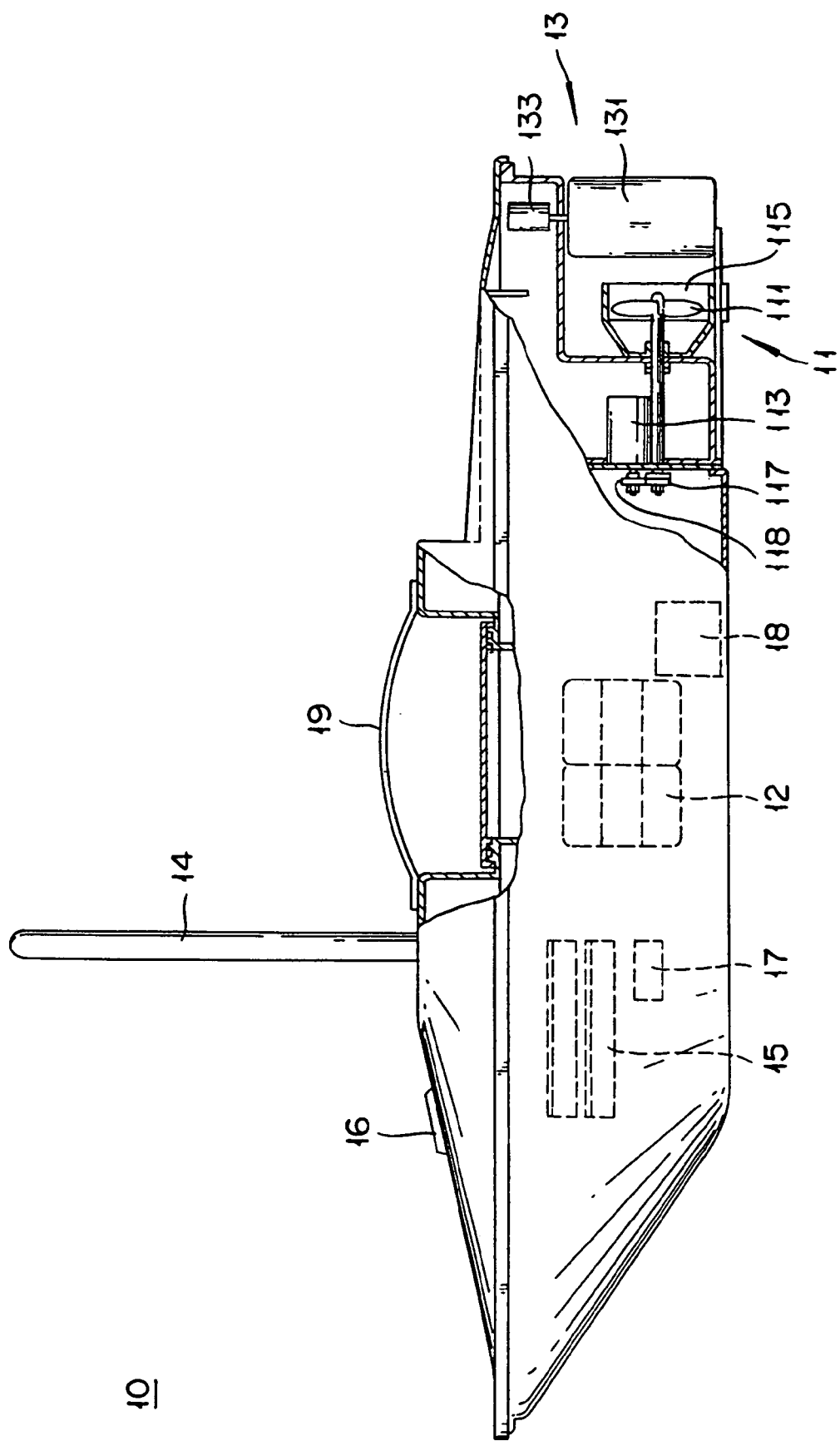
FIG. 2 is a partial cross section which views the boat laterally.
Figure 3:
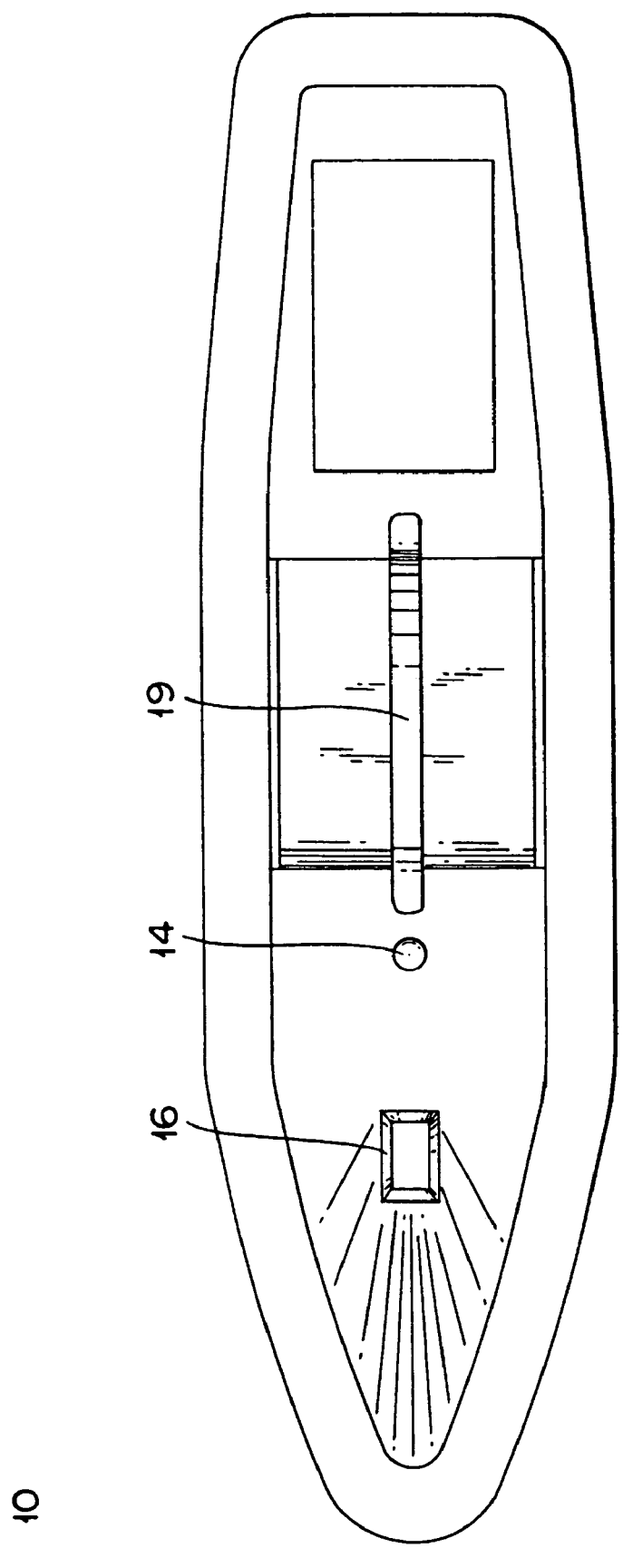
FIG. 3 is a plane view of the boat.

FIG. 2 is a partial cross section viewing the boat laterally and FIG. 3 is a plane view of the boat.

The boat 10 is composed of a propelling power source 11, a power source 12, a steering device 13, a first transmit-receive antenna 14, a first controller (control circuit) 15, a GPS antenna 16, a memory device 17, a surveying device 18, and a handle 19.

The propelling power source 11 is composed of a screw 111, a motor 113 for transmitting rotary power to the screw 111, and a screw cover 115.

The screw 111 is provided at one end thereof with a propeller. The screw 111 is provided at the rotary shaft thereof with a toothed wheel 117. The motor 113 is provided at the rotary shaft thereof with a toothed wheel 118. The toothed wheel 117 and the toothed wheel 118 are meshed with each other so that the rotary power of the motor 113 will be transmitter to the screw 111. When the screw 111 is rotated, the water is pushed away backward and the boat 10 is caused to generate a propelling power toward the front.

The motor 113 is connected to the power source 12 and is supplied with a proper electric power depending on the operating signal from the control device 20. Normally, the electric current of the power source 12 is supplied in a fixed direction to the motor 113. By causing this electric current to supply in the opposite direction, however, it is made possible to impart to an opposite rotation to the motor 113 and cause the screw 111 to rotate in the opposite direction. As a result, the boat 10 can be retracted.

The screw 111 is provided on the periphery of the propeller thereof with the screw cover 115. Owing to the presence of the screw cover 115, the screw 111 is not entwined by such suspended matter as alga and refuse.

The power source 12 supplies electric power to various components of the boat 10 besides the motor 113 mentioned above. The supply of electric power is controlled by the first controller 15. The residue of the power source 12 is monitored by the first controller 15.

The steering device 13 is disposed behind the propelling power source 11.

The steering device 13 is provided with a rudder 131 and a motor 133. The rudder 131 is connected to the rotary shaft of the motor 133. It is rotated proportionately to the angle of rotation of the motor 133. Consequently, the rudder 131 is swung laterally. The rudder 131 so swung is enabled to change the direction of the stream current from the screw 111 of the propelling power source 11 and change the direction of the advance of the boat 10. The rudder 131 is capable of swinging in an approximate angle of 60 degrees laterally from the posture perpendicular to the screw 111.

The motor 133 is connected to the power source 12 and is supplied with the electric power while changing the direction of advance of the boat 10. The supply of the electric power is controlled by the first controller 15, based on the operating signal from the steering device 20. The first transmit-receive antenna 14 is erected on the upper part of the boat 10. The first transmit-receive antenna 14 has a length such that it may infallibly receive the electric wave from the steering device 20 and may never affect adversely the balance of the boat 10. The first transmit-receive antenna 14 is connected to the first controller 15 and enabled to transmit the electric wave received at the first controller 15. The first transmit-receive antenna 14 transmits to the steering device 20 the signal produced by the first controller 15.

The first controller 15 comprehensively controls the whole of the boat 10. The first controller 15 is connected to the GPS antenna 16, the memory device 17, and the surveying device 18 besides the configuration described above.

The GPS antenna 16 is such an antenna as to receive the electric wave transmitted by a plurality of artificial satellites. The electric waves from the plurality of artificial satellites which have been received by the GPS antenna 16 are transmitted to the first controller 15. The first controller 15 performs a calculation based on the received electric waves and determines the present position of the boat 10. The method for determining the present position is the same as the determination of the position by the ordinary GPS, the description thereof will be omitted.

The memory device 17 is connected to the control device 15. The memory device 17 memorizes the position which is set as the initial position of the boat 10. The term "initial position" as used herein means the position determined by the GPS antenna 16 at and the first controller 15 at the time that the operation of the boat 10 is initiated. The initial position may be set at any place. The initial position is the position to which the boat 10 returns at the time of the automatic regression of the boat 10 to be specifically described herein below.

The memory device 17 memorizes not merely the initial position but also the positions calculated as present positions up to the present time by the GPS antenna 16 and the first controller 15, namely the route passed by the boat 10 up to the present time.

The surveying device 18 is a device for surveying the states of a water body and a water bottom. The surveying device 18 is furnished with an ultrasonic wave oscillator and enabled to transmit an ultrasonic wave of a fixed frequency or ultrasonic waves of different frequencies into the water body and receive the waves reflected by the water bottom. Thus, it is capable of determining the object in the water body such as a school of fish or the contour of the water bottom based on the time required for the transmitted ultrasonic wave to return.

The sonar may be cited as a concrete example of the surveying device 18. The surveying device 18, however, does not need to be limited to what utilizes an ultrasonic wave as the sonar. Any device which permits observation of the state in a water body may be used as the surveying device 18. It is permissible to use a video camera or a CCD camera, for example, as the surveying device 18. The image in a water body may be taken in the natural position by the video camera or CCD camera. When the video camera or the CCD camera to be used is possessed of a telescopic function, the image to be taken in can be magnified in conformity with the magnifying ratio to be set in the camera.

The observatory information concerning the state of a water body or a water bottom secured by the surveying device 18 is synchronized with the coordinates of the present position obtained from the GPS antenna 16 and transmitted with a specific electric wave whenever necessary to the steering device 20 through the medium of the first transmit-receive antenna 14.

The handle 19 is attached to the upper part of the boat 10. This handle 19 is a part which is gripped by the user in carrying the boat 10.

(Steering Device)

Figure 4:
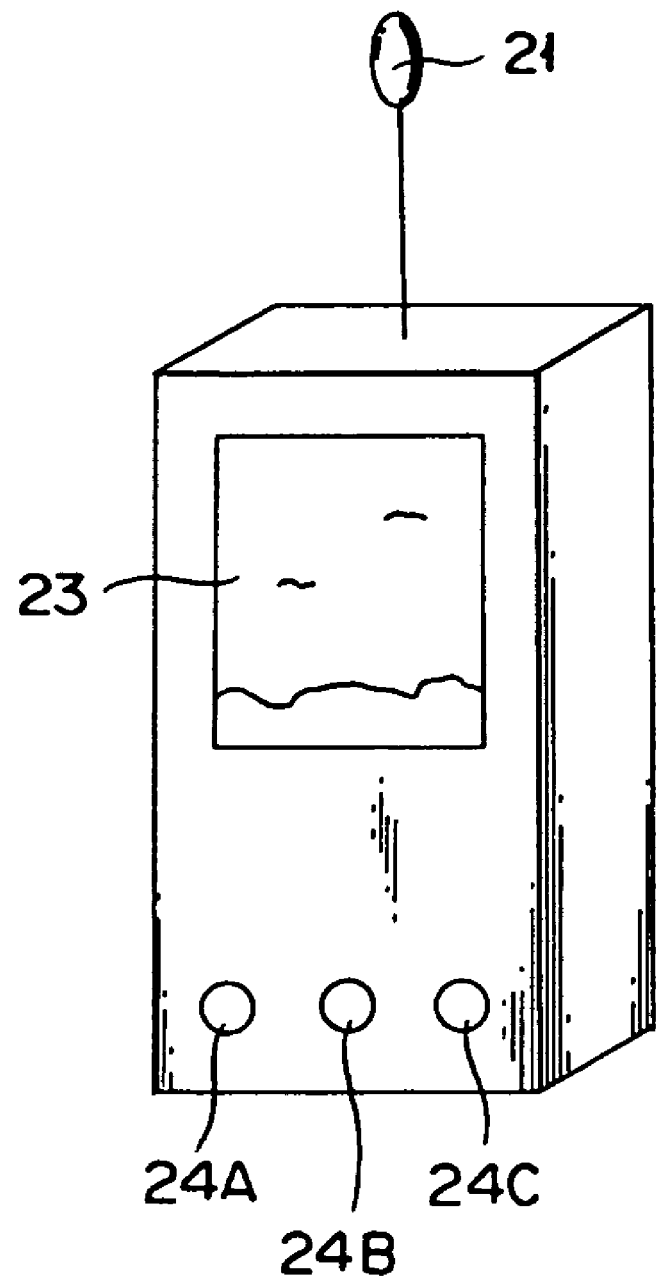
FIG. 4 is a perspective view illustrating the external appearance of a steering device.
Figure 5:
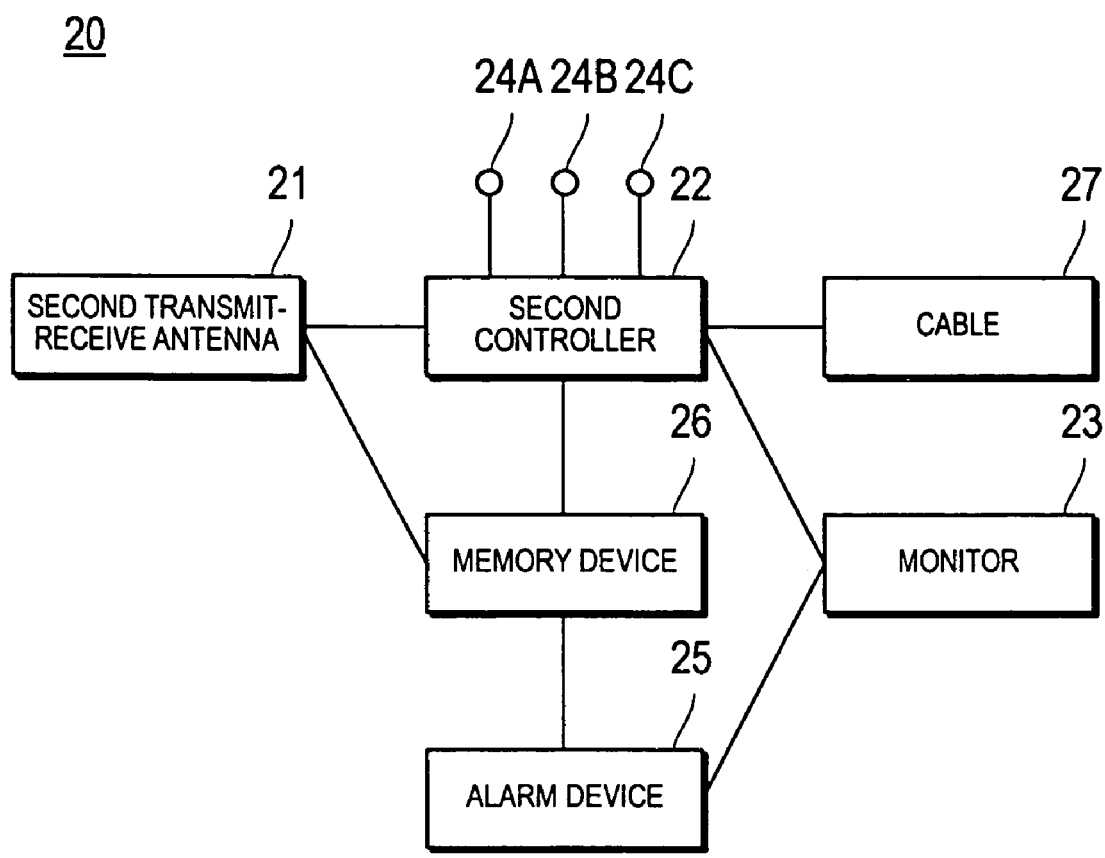
FIG. 5 is a block diagram illustrating the construction of the steering device.
Figure 6:
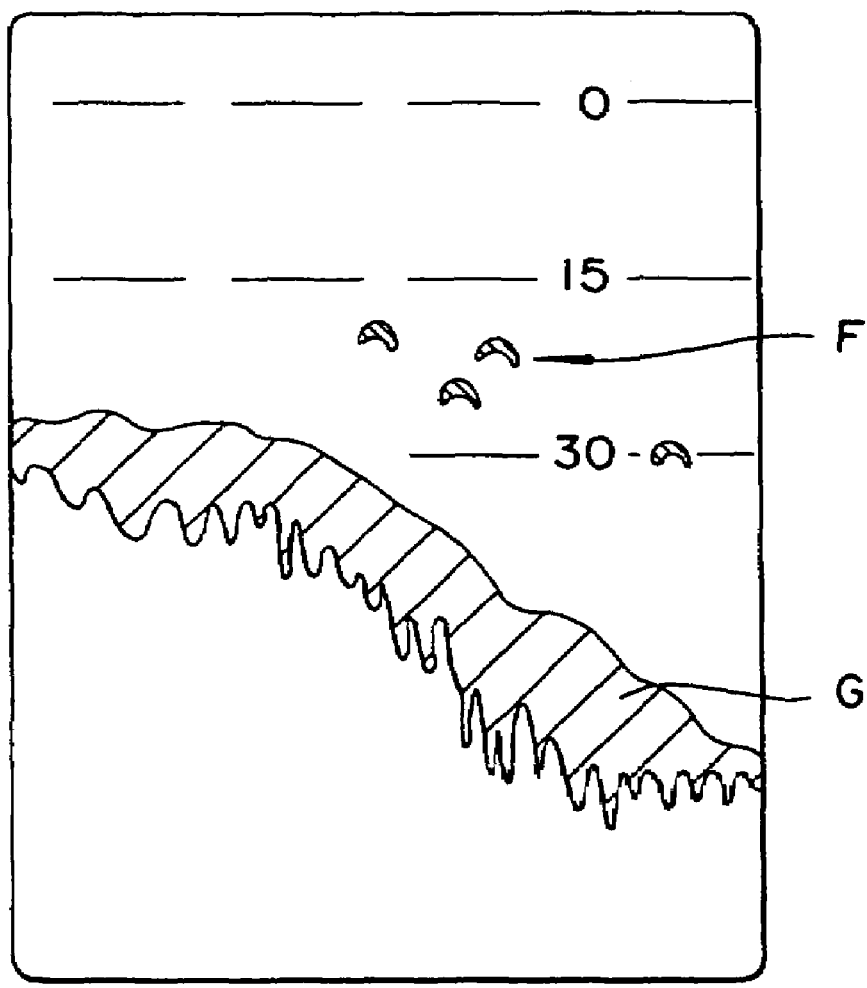
FIG. 6 is a diagram depicting an example of display on a monitor.

FIG. 4 is a perspective view illustrating the external appearance of the steering device, FIG. 5 is a block diagram depicting the construction of the steering device, and FIG. 6 is a diagram showing an example of display on a monitor.

The steering device 20 is a device for steering the boat 10 from a point at some distance.

The steering device 20, as illustrated in FIG. 4 and FIG. 5, is provided with a second transmit-receive antenna 21, a second controller 22, a monitor 23, an operating button 24, an alarm device 25, a memory device 26, and a cable 27. By attaching a separate external antenna to the steering device 20, it is made possible to improvise the steering device 20 as a base station and expand the range of transmission and reception further. In the present invention, the concept of the steering device includes a base station. Alternatively, an antenna may be disposed at a position different from the steering device and utilized for collecting information for the surveying device. When the steering device and the antenna are disposed at different positions, the base station including them is embraced in the concept of the steering device.

The second transmit-receive antenna 21 transmits various signals to the boat 10 in response to the operation of the steering device 20 by the operator. For example, the second transmit-receive antenna 21 transmits a signal for driving the propelling power source 11 with the object of advancing the boat 10, a signal for controlling the steering device 13 with the object of converting the direction of the boat 10, and a signal for starting the surveying device 18 with the object of surveying the state of a water body.

The second controller 22 is incorporated in the steering device 20 and adapted to effect comprehensive control of the whole of the steering device 20.

The monitor 23 is disposed in front of the steering device 20. The monitor 23, as indicated with oblique lines in FIG. 6, displays a topographic map G of a water bottom and a school of fish F. By the display on the monitor 23, the operator is enabled to confirm the undulations of a water bottom and the position of the school of fish. The monitor 23 displays a proper scale such as, for example, a water depth with intervals of 15 m.

Further, the monitor 23 is capable of displaying a map and a position of the boat 10. In this case, the operator is enabled to steer the boat 10 by observing the monitor 23. The monitor 23 is further capable of issuing an alarm to the operator when the residue of electric power of the boat 10 is running short.

The operating buttons 24 are placed on the steering device 20 in the form of buttons which may be pressed by the operator. A total of three kinds of operating button 24A-24C are used. The operating buttons 24A-24C, when pressed, issue respectively prescribed signals to the second controller 22.

The operating button 24A, when pressed, issues a signal for starting the surveying device 18. The operating button 24B, when pressed, issues a signal for starting the propelling power source 11. The operating button 24C, when pressed, issues a signal for controlling the steering device 13.

For example, the operator presses the operating button 24B for advancing the boat 10 and presses the operating button 24C for rotating the boat 10. He presses the operating button 24B twice in succession for retracting the boat 10.

The operation of the boat 10 does not need to be limited to what is attained with the operating buttons 24. The boat 10 may be manipulated with a control stick.

The alarming device 25, on receiving such a signal as indicates a decrease in the residue of electric power from the boat 10 through the medium of the second transmit-receive antenna 21, causes this information to be displayed on the monitor 23 and issues an alarm with its own voice.

The memory device 26 memorizes the coordinates of the position of the boat 10 transmitted from the boat 10 and the information of the topographic map of the water bottom of that position. The information stored in the memory device 26 can be transmitted to the computer 30 through the medium of the cable 27.

(Computer)

Figure 7:
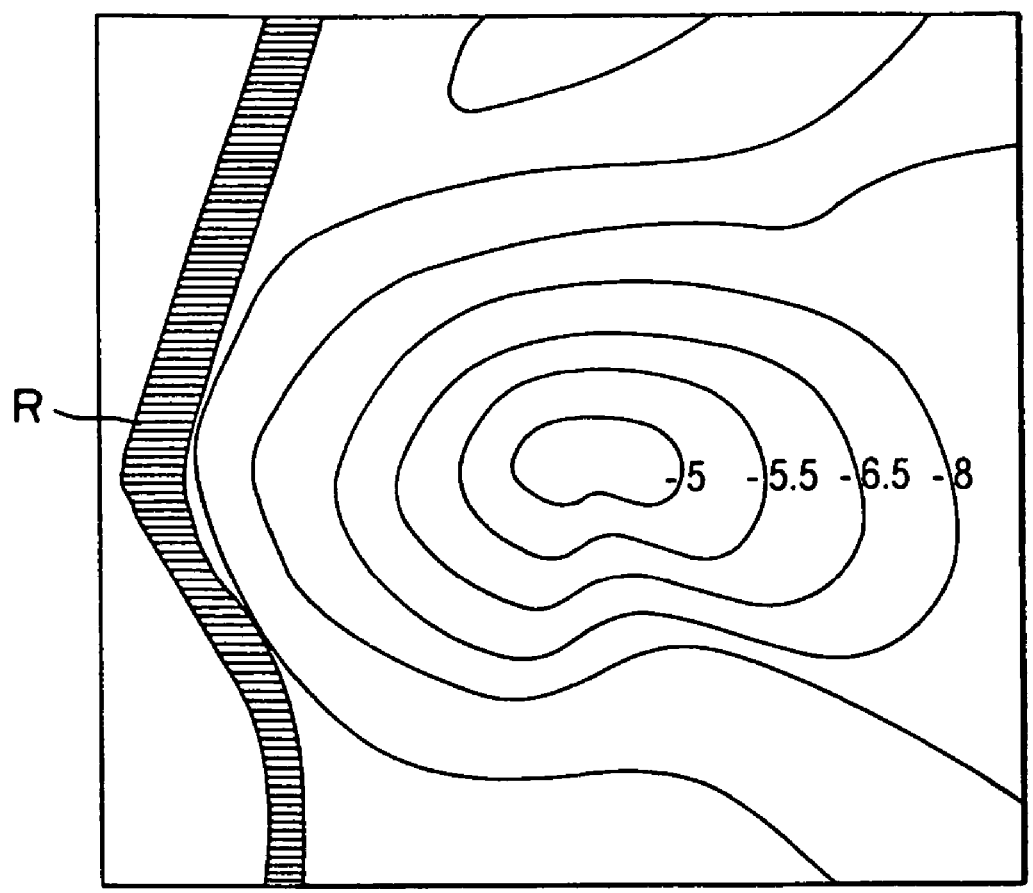
FIG. 7 is a diagram depicting a map of water bottom produced.
Figure 8:
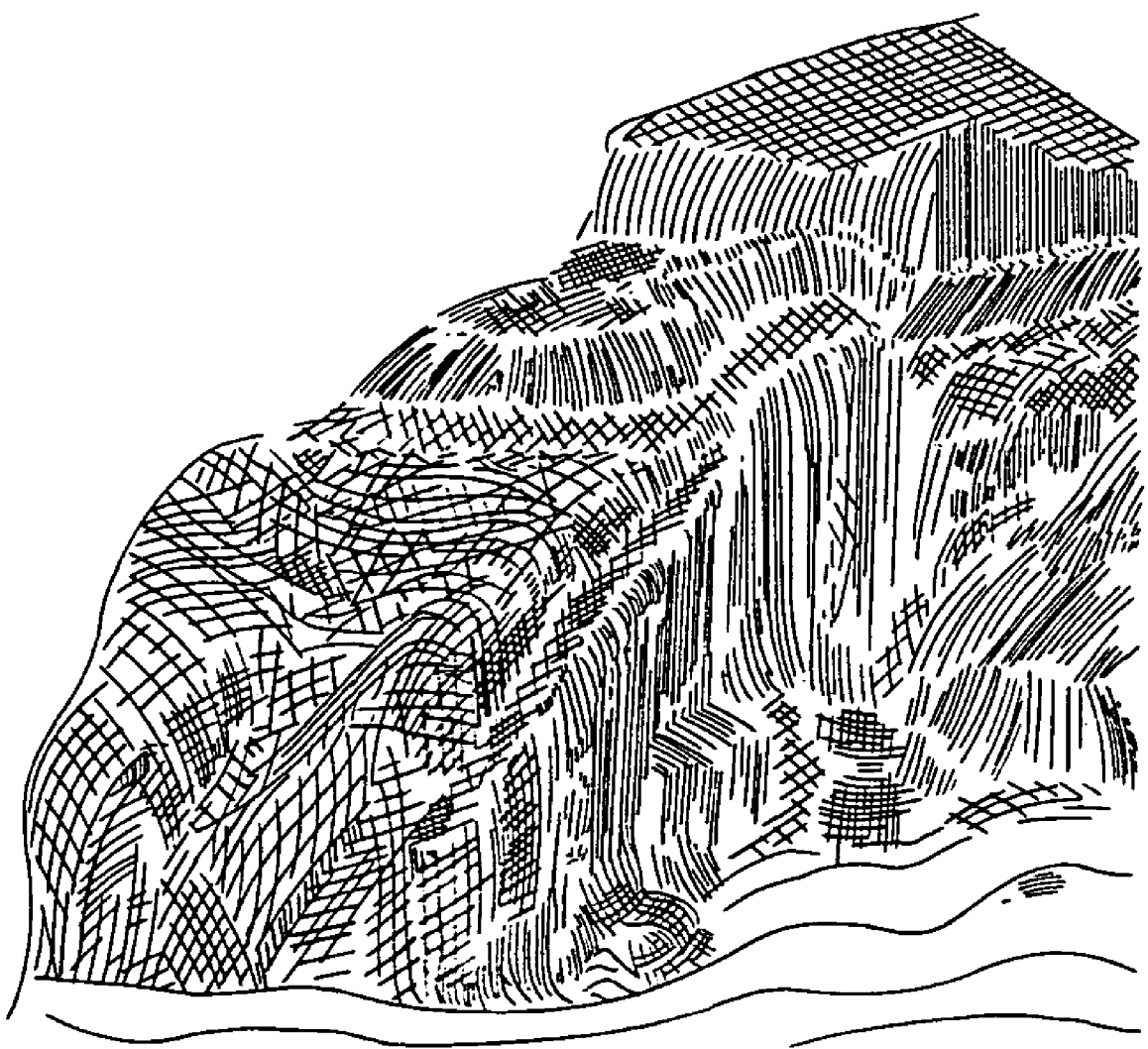
FIG. 8 is a diagram depicting a map of water bottom contour produced.

FIG. 7 is a diagram depicting an isobath map of the water bottom produced and FIG. 8 is a diagram depicting a fathometric map of the water bottom produced.

The computer 30 receives and stores the coordinates of a given position and the information of the topographic map of the water bottom of that position transmitted by the steering device 20 through the medium of the cable 27. The computer 30 supplements not stored information between the coordinates based on the information stored. It consequently produces such an isobath map of a water bottom as shown in FIG. 7 and such a fathometric map of a water bottom as shown in FIG. 8 and displays a topographic map of the water bottom.

The map shows the depth with an isobath as shown in FIG. 7. Such a large depression as a groove is shown in the form of a region indicated by reference symbol R. The map may be represented alternatively in the form of a cubic shape as shown in FIG. 8.

The mode of embodiment given above has depicted the steering device 20 and the computer 30 as separate components. Optionally, part or the whole of the function of the computer 30 may be vested on the steering device. To be specific, the computer 30 is not connected to the steering device 20 and the steering device alone is enabled to produce the map of a water bottom and displays it in the place of the computer 30.

(Operation)

Now, the operation of the boat 10 of this invention will be described below.

Figure 9:
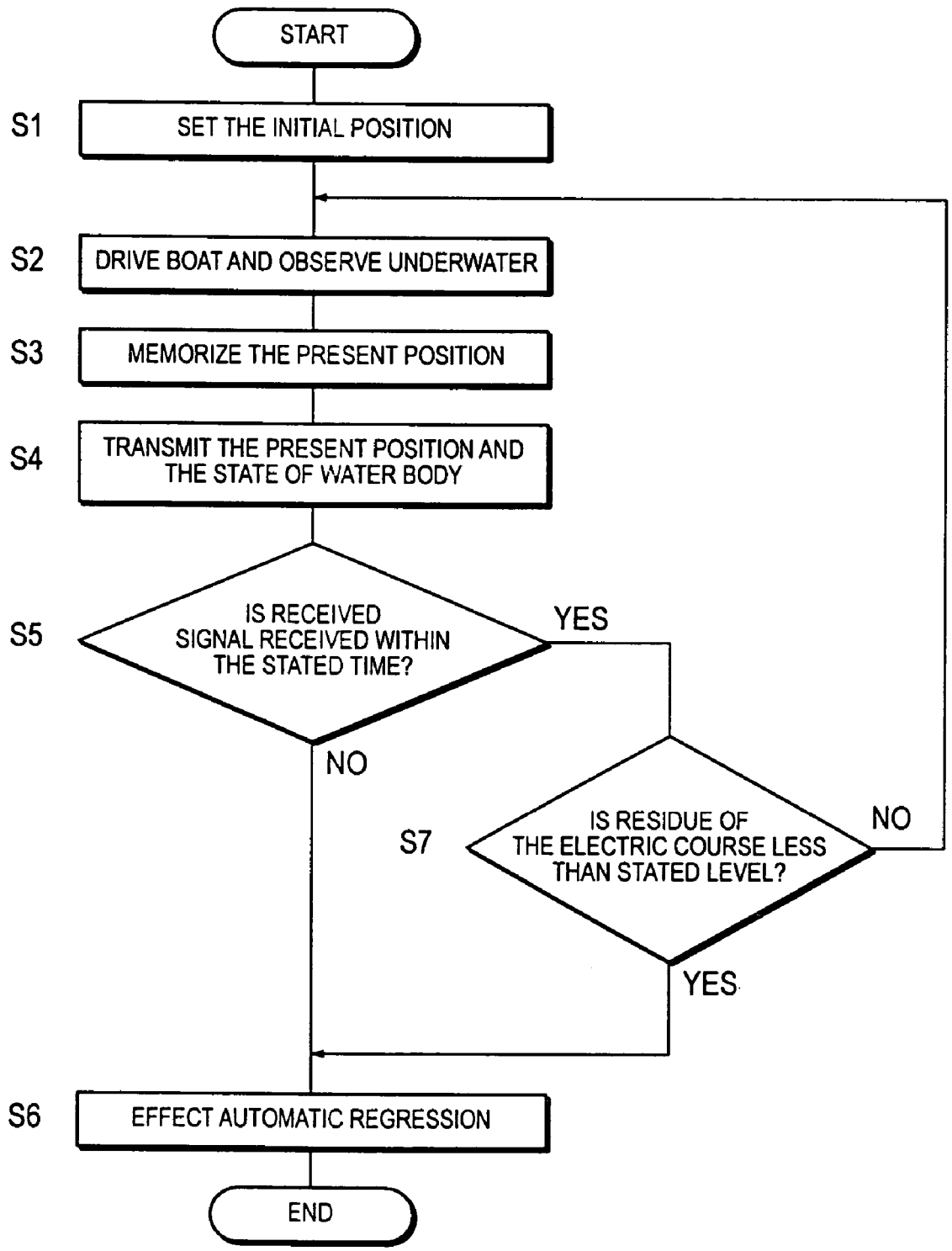
FIG. 9 is a flow chart illustrating the flow of motions of a boat.

FIG. 9 is a flow chart illustrating the flow of operations of the boat. The controls of the component parts of the boat 10 have been already described with respect to the first controller 15.

The boat 10 is moved on the water surface of the position at which the operator decides to survey the particular water bottom. The memory device 17 of the boat 10 is caused to memorize the present position acquired by means of the GPS as the initial position (Step S1). The memory of the initial position by the boat 10 is triggered, for example, by the operator transmitting a prescribed signal to the boat 10 by pressing the button 24 of the steering device 20.

The boat 10 has the surveying device 18 started and used to survey the water body and the water bottom while advancing on the water surface in conformity with the operator's manipulation of the steering device 20 (Step S2). At this time, the boat 10 causes the recording device 17 to store the present position acquired automatically by the GPS and forms the information of the path traveled so far (Step S3). At the same time, the boat 10 transmits the present position and the state of the water body and the water bottom of the present position to the steering device 20 (Step S4).

When the steering device 20 receives the information of the present position of the boat 10 and the state of the water bottom, the steering device 20 returns the signal confirming the reception. The boat 10 judges whether the signal of reception has been received from the steering device 20 within a prescribed period of time (Step S5).

The prescribed period of time means the length of time such as, for example, one minute which is sufficient for judging that the communication has incurred any abnormality. Between the boat 10 and the steering device 20, the transmission and the reception of the present position of the boat 10 and the signal of reception are carried out about four times within one second. When this frequency is taken into consideration, the absence of communication lasting for one minute ought to allow the operator to judge that the communication has incurred abnormality. The boat 10 fails to receive the signal of reception when the boat 10 has moved to the region outside the reach of the electric wave, when the first transmit-receive antenna 14 has been broken, or when the state of electric wave has been deteriorated by strong wind, heavy rainfall, or dense fog.

When the signal of reception has not been received within the prescribed time (Step S5: YES), the boat 10 initiates automatic regression with the judgment that it is no longer capable of communicating with the steering device 20 (Step S6). The term "automatic regression" means the fact that the boat 10 returns by the automatic steering to the initial position. During the return to the initial position, the boat 10 follows backward the path traveled so far with reference to the information stored in the memory device 17. By following backward the path traveled so far, the boat during the course of the automatic regression will not collide against any obstacle.

When the signal of reception is received within the prescribed time (Step S5: NO), the boat 10 checks the residue of the power source 12 and determines whether the residue falls short of a prescribed level (Step S7). The prescribed level is one half of the maximum capacity of the power source, for example.

When the residue of the power source is less than the prescribed level (Step S7: YES), the boat 10 effects the automatic regression to the initial position by following the procedure of Step S6 described above.

Thus, the boat 10 of this invention is enabled to attain the automatic regression to the initial position by utilizing the GPS when it is disabled to continue the communication with the steering device 20. The boat 10, therefore, can be recovered even when the boat 10 is no longer capable of being steered by the steering device 20. That is, the loss of the boat can be prevented.

Further, the boat 10 of this invention attains the automatic regression to the initial position even when the residue of the electric source 12 of the boat decreases to below the prescribed level. Thus, the boat 10 never fails to return to the operator because the residue of the electric course 12 has no possibility of completely running out.

The boat 10 of this invention always transmits continuously the present position and the state of the water bottom at that position to the steering device 20. On the steering device 20 side, therefore, the position and the state of the water bottom can be stored and the map can be formed based on the stored information.

The mode of embodiment described above contemplates effecting the automatic regression of the boat 10 when the signal of reception is not received within the prescribed time.

Alternatively, the automatic regression of the boat 10 may not be continued till the initial position but may be terminated at the time that the communication with the steering device 20 is redeemed so that the operator may be enabled to steer the boat 10 by means of the steering device 20.

In the mode of embodiment described above, the boat 10 during the course of the regression returns by following backward the path traveled so far. Instead of returning backward the path traveled so far, the boat 10 may be regressed in a straight line to the initial position. When the boat 10 does not return backward along the path traveled so far, it is preferably furnished with a sensor capable of detecting an obstacle and is thereby enabled to avoid the obstacle automatically. When the boat 10 needs to effect automatic regression while the residue of the electric source 12 is running short, the return backward along the path traveled so far requires this regression to start when the residue of the electric source 12 is at least not less than one half of the capacity. When the boat 10 is provided with the sensor capable of detecting an obstacle, it can be made to effect the automatic regression to the operator's position even when the residue of the electric source 12 decreases to less than one half of the capacity.

Incidentally, the mode of embodiment described above has been depicted as using the boat 10 itself in surveying the topographical map of the water bottom. The boat 10, however, can be used for various forms of determination by duly altering the functions of the surveying device 18 to be loaded.

For example, it can be used for the determination of the speed relative to the ground, the speed relative to the water, and the speed of the tidal current. In this case, the surveying device 18 is provided with a plurality of ultrasonic wave radiators. The ultrasonic wave radiators oscillate ultrasonic waves in directions successively deviated slightly lengthwise and bilaterally relative to the right angle. By receiving the waves reflected by the water bottom and comparing the frequency of the received reflected waves with the frequency of the transmitted ultrasonic waves, it is made possible to determine the speed relative to the ground owing to the difference in frequency. This determination is based on the principle of Doppler effect. The true speed relative to the ground is fixed by calculating the speeds of the plurality of ultrasonic wave oscillators individually relative to the ground by utilizing the Doppler effect and averaging the speeds consequently found. This rule permits accurate determination of the speed relative to the ground by excluding the speed of the boat 10 due to the vertical undulation of the waves.

In the determination of the speed relative to the water, the speed relative to the tidal current can be determined by receiving the waves reflected by the microorganisms floating in water body and the interface between ocean currents differing in temperature.

Further, in the determination of the speed of tidal current, this speed of the tidal current can be determined by deducting the speed relative to the water from the speed relative to the ground determined by the method mentioned above.

Thus, various kinds of speed of the boat 10 can be determined as described above.

The boat 10 is further capable of surveying the geology which forms the water bottom. In this case, the surveying device 18 of the boat 10 transmits an ultrasonic wave of high frequency and an ultrasonic wave of a low frequency. The ultrasonic wave of the higher frequency is reflected by the surface of a water bottom. Meanwhile, the ultrasonic wave of the lower frequency is allowed to permeate the water bottom to a greater depth than the ultrasonic wave of the higher frequency and then is reflected. The depth in the water bottom at which the ultrasonic wave of the lower frequency is reflected increases in proportion as the softness of the geology increases. The geology can be surveyed based on this principle using two kinds of ultrasonic waves different in frequency.

Further, the boat 10 is capable of effecting observation of the state of the environment. In this case, the surveying device 18 is caused to transmit an ultrasonic wave in the horizontal direction. Then, by receiving the reflected waves, it is made possible to detect an obstacle which exists in the environment. By making use of this principle, it is made possible to prevent automatically the boat 10 in the course of automatic regression from colliding against an obstacle. Incidentally, even in the same horizontal direction, by creating time differences with a plurality of oscillators and inducing generation of ultrasonic waves, it is made possible to impart artificial angles to the ultrasonic waves and permit detection of the states more or less above or below the horizontal direction. When the boat 10 ingresses into a cave, it may be enabled to determine the shape of the cave by transmitting ultrasonic waves in the horizontal direction.

By utilizing the fact that the state in the horizontal direction can be detected, the boat 10 is enabled to survey a vertical hole and determine whether it is formed perpendicularly. In this case, the boat 10 is loaded with a weight and is caused to sink straightly into the vertical hole and detect successively the shapes of the vertical hole at stepped depths. When the shape of the horizontal hole shows a deflection, the boat 10 is enabled to decide that the horizontal hole is not perpendicularly homed.

The various kinds of information which are observed and determined as described above are transmitted to the steering device 20. The transmitted information is analyzed and displayed by the steering device 20 or the computer 30.

The remote control unmanned boat does not need to limit the collection of information to the signal of travel from the remote control device.

Before the boat is started, the longitudes and the latitudes of the main points of the region selected for survey of water bottom can be fed into the memory device 17 loaded in advance on the boat 10. In this case, the boat is capable of effecting automatic travel to the target along the course stored in the memory device 17.

The boat 10 transmits to the base station the information resulting from synchronizing the information of survey concerning the states of water body and water bottom under the traveled course with the GPS position information. Alternatively, the boat 10 continues its automatic travel while having the information of survey and the GPS position information memorized and stored as correlated in the memory device 17 of the boat 10.

When the boat 10 has the information of survey memorized in the interior thereof, the information of survey may be reproduced by being fed from the memory device 17 into the computer after the automatic regression of the boat 10 even if the data transmission of the information of survey is torn apart by the meteorological conditions or the influences of obstacle. The information of survey may be stored in such a recording medium as, for example, CD or DVD. In this case, the memory device 17 of the boat 10 has a recording medium endowed with the function of recording the information of survey. The computer is capable of accurately forming an isobath map or a fathometer map based on the information of survey stored in the boat 10. The map thus produced can be exhibited on the display. The information of survey, when recorded on such a recording medium as, for example, CD or DVD, it can be utilized for future study.

While the invention has been described with reference to the preferred embodiment thereof, it will be appreciated by those of ordinary skill in the art that modifications can be made to the parts that comprise the invention without departing from the spirit and scope thereof.

What is claimed is:

1. A remote control unmanned boat comprising:
   a propelling power source for generating a propelling power,
   a steering device for freely varying the direction of travel,
   a first transmit-receive antenna for receiving a signal transmitted by radio by a remote control device,
   a first controller for controlling said propelling power source and said steering device based on said signal received by said first transmit-receive antenna,
   a memory device for memorizing an initial position set in advance,
   a GPS antenna for receiving an electric wave transmitted from an artificial satellite,
   said first controller being adapted to calculate the present position based on the electric wave received by said GPS antenna and, when stated conditions are satisfied said first transmit-receive antenna becomes temporarily disabled so that it becomes temporarily incapable of receiving said signal, to initiate automatic control of said propelling power source and said steering device so as to be regressed to the initial position based on said present position and said initial position, and
   said first controller, when said first transmit-receive antenna becomes capable of receiving said received signal during said automatic control, terminates said automatic control and resumes control based on the signal from said remote control device,
   a surveying device for surveying the states of water body and water bottom, wherein said first transmit-receive antenna causes information obtained from the survey concerning the states of water body and water bottom surveyed by said surveying device to be transmitted by a specific electric wave to said remote control steering device,
   a second transmit-receive antenna for transmitting by radio the signal concerning the operations of said propelling power source and said steering device to said remote control unmanned boat and receiving the information obtained from the survey concerning the states of water body and water bottom surveyed by said surveying device, and
   a second controller for feeding the signals of operations concerning said propelling power source, said steering device, and said surveying device to said second transmit-receive antenna.

2. A remote control unmanned boat according to claim 1, wherein said surveying device further serves to determine the speed relative to the ground surface, the speed relative to the tidal current, and the speed of the tidal current, survey the geology of water bottom, and survey the state of the environment in the horizontal direction.

3. A remote control unmanned boat according to claim 1, wherein said first transmit-receive antenna continuously transmits the information of the present position calculated by said first controller to a remote control device and continuously receives the received signal returned from said remote control device, and said first controller initiates said automatic control when said first transmit-receive antenna is not capable of receiving said received signal for a prescribed time.

4. A remote control unmanned boat according to claim 1, wherein said memory device memorizes, when necessary, the positions calculated as the present positions at individual time points by said first controller, and said first controller, during the course of said automatic control, controls said propelling power source and said steering device so as to pass the present positions at the individual time points memorized in said memory device.

5. A remote control unmanned boat according to claim 1, wherein said first controller, during the course of said automatic control, controls said propelling power source and said steering device so as to return to said initial position in the shortest distance.

6. A remote control unmanned boat according to claim 1, which further comprises a surveying device for surveying the states of water body and water bottom wherein said memory device memorizes the information of survey concerning the states of water body and water bottom surveyed by said surveying device.

7. A remote control unmanned boat according to claim 6, wherein said memory device records said information of survey in a recording medium.

8. A remote control unmanned boat according to claim 1, which further comprises a surveying device for surveying the states of water body and water bottom and wherein said memory device memorizes the longitudes and the latitudes of important points in the region selected for survey, and said first controller controls said propelling power sources and said steering device so as to pass said points.

9. A remote control device according to claim 1, which further comprises a monitor for displaying the state of water body and the present position based on said information of survey received from said second transmit-receive antenna.

10. A remote control device according to claim 1, which further comprises an alarm device for issuing an alarm when the communication with said remote control unmanned boat cannot be continued for a stated time or when the signal indicating a decrease of the electric source is received from said remote control unmanned boat.

11. A remote control unmanned boat according to claim 1, which further comprises an alarm device for informing by an alarm or a monitor for informing by display on a screen the termination of automatic control of said remote control unmanned boat when the communication with said remote control unmanned boat is not continued for a stated time and subsequently the communication with said remote control unmanned boat is rendered resumable.

12. A remote control device according to claim 9, wherein said second controller draws a map of a water body and a water bottom based on said information of survey received from said second transmit-receive antenna, and said monitor displays a map formed by said second controller.

13. A remote control device according to claim 1, which further comprises a recording device for recording said information of survey received from said second transmit-receive antenna on a recording medium.

* * * * *